United States Patent [19]

Lintell et al.

[11] 4,231,534
[45] Nov. 4, 1980

[54] ACTIVE OPTICAL TRACKING SYSTEM

[75] Inventors: Robert J. Lintell, Altadena; James D. Campbell, Pasadena, both of Calif.

[73] Assignee: The United States of America as represented by the Secretary of the Air Force, Washington, D.C.

[21] Appl. No.: 850,101

[22] Filed: Nov. 4, 1977

[51] Int. Cl.³ .............................................. F42B 15/02
[52] U.S. Cl. .................................. 244/3.16; 250/203 R
[58] Field of Search ........................ 244/3.16; 350/16; 250/203 R

[56] References Cited

U.S. PATENT DOCUMENTS

| | | | |
|---|---|---|---|
| 3,698,790 | 10/1972 | Berry | 350/16 |
| 4,087,061 | 5/1978 | Burt | 244/3.16 |
| 4,105,174 | 8/1978 | Blomgvist et al. | 244/3.16 |

Primary Examiner—Charles T. Jordan
Attorney, Agent, or Firm—Joseph E. Rusz; Henry S. Miller, Jr.

[57] ABSTRACT

An active optical tracking system for air-to-air type missiles of relatively small dimensions having a pulsed laser transmitter operating through a gimbaled mirror system and a reflection receiving system connected to the guidance and control unit of the missile to direct it to a target.

1 Claim, 2 Drawing Figures

ACTIVE OPTICAL TRACKING SYSTEM

STATEMENT OF GOVERNMENT INTEREST

The invention described herein may be manufactured and used by or for the Government for governmental purposes without the payment of any royalty thereon.

BACKGROUND OF THE INVENTION

The invention relates generally to missile guidance systems, and more particularly to such a system having an active optical tracking subsystem.

Missile guidance systems are in general of two basic classes. The first class is the on board guidance system which is an integral part of the control system located within the missile. The second is the independent system which is located away from the missile, however tracks a target and, utilizing telemetry or other means, sends error correction signals to the missile control system.

The first class, or on board system, is of interest in this disclosure. Commonly referred to as a "seeker", the system performs several functions including acquisition of a target upon command; tracking of the target after acquisition and during missile flight, and derivation and reprocessing of the data necessary for the guidance subsystem to execute control of the missile flight.

In considering, for example, the air-to-air missile, existing optical missiles utilize passive seekers generally operating in some portion of the infrared spectrum. This is typically within the 2-5 micron band. Guidance or seeker data is derived from target radiation, thus allowing reasonable tracking of an appropriate target.

At least one countermeasure system has been devised to thwart the passive optical seeker in a very effective and inexpensive manner. This involves the release of radiation sources by the target which are in the same spectral region as the target infrared source but much more intense. This causes the missile seeker to track and destroy a harmless radiation source at a safe distance from the target.

Active optical systems have been considered. However, a substantial difficulty has occurred in designing a system which is small, lightweight, inexpensive, and still reliable enough to use in a missile system. The invention disclosed herein solves these problems and by utilizing the laser provides a highly accurate tracking system.

SUMMARY OF THE INVENTION

The new approach to active optical tracking systems is to utilize an intense optical source referred to as a transmitter. This source is integrated within and becomes part of the seeker. Operated in a pulsed mode, the transmitter radiation is reflected from the target and is detected by the receiver to yield tracking data.

More specifically, the system consists of a pulsed laser as a transmitter, a properly configurated detector/optics system as a receiver, a precessible free gyro and a processor for range-to-target and target line of sight data. Also included is a search programmer for target acquisition control, a servo subsystem for precession control (tracking) and range, range rate angle and angle rate data output for missile guidance control.

Unique to this concept is the integration of the optical transmitter within the seeker. The configuration described uses a gimbal-mounted precessible free gyroscope. By utilizing a transmitter-receiver configuration which will direct the transmitter beam through each gimbal axis, in turn with mirrors or prisms to place the transmitted beam on the gimbal mechanical centerline, a low cost, compact configuration capable of up to ±60° gimble angle is achievable.

It is therefore an object of the invention to provide a new and improved active optical tracking system.

It is another object of the invention to provide a new and improved active optical tracking system that operates independent of target radiation.

It is a further object of the invention to provide a new and improved active optical tracking system that has wider angle tracking than any known system.

It is still another object of the invention to provide a new and improved active optical tracking system that is accurate and precise in target intercept.

It is still a further object of the invention to provide a new and improved active optical tracking system which provides a wide range of accurate information for tracking, navigation, and fuse control.

It is another object of the invention to provide a new and improved active optical tracking system that is small, light in weight, and inexpensive to construct.

It is another object of the invention to provide a new and improved active optical tracking system that is more reliable than any similar known system.

These and other advantages, features and objects of the invention will become more apparent from the following description taken in connection with the illustrative embodiment in the accompanying drawings.

DETAILED DESCRIPTION OF THE PREFERRED EMBODIMENT

Figure 1:
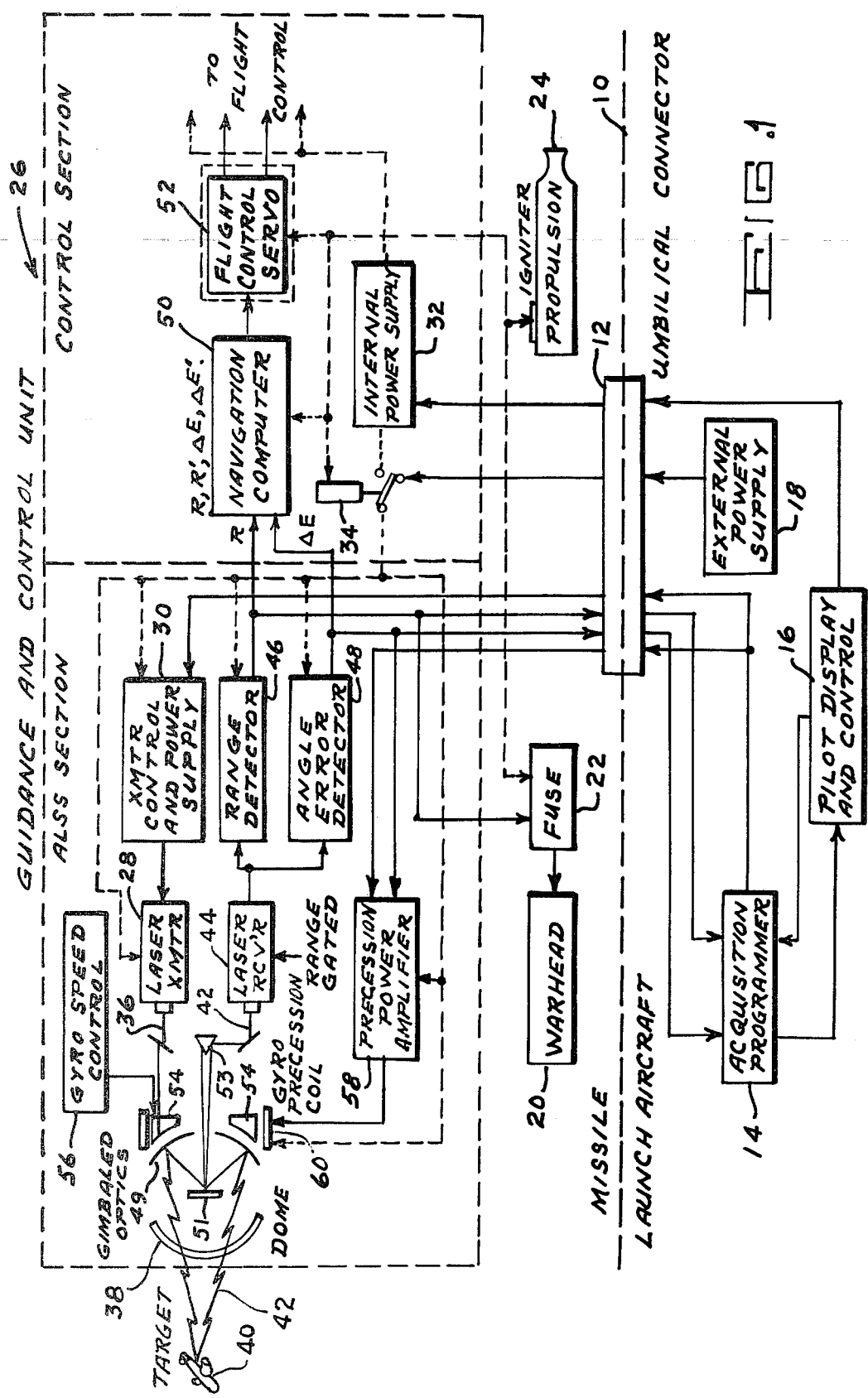
FIG. 1 is a functional block diagram of a system utilizing the invention.

Referring now to FIG. 1, there is shown a functional block diagram of an active optical missile guidance and control unit utilizing the tracking system of the invention. Line 10 indicates the distinction between missile components and launch aircraft components. A connection between missile and aircraft is made through the umbilical connector 12. Basic components contained in the aircraft are shown as the acquisition programmer 14, pilot display and control console 16 and external power supply 18. The missile consists of the warhead 20, fuse 22, propulsion system 24, and the guidance and control unit generally shown at 26.

The active optical tracking system utilizes a pulsed laser 28 as an energy transmitting source. The transmitter is controlled from the power supply 30. Power is supplied via the dashed lines from either the aircraft power supply 18 or the missile internal power supply 32 via switch 34. The transmitted laser beam 36 is directed through gimbaled optics, as will be explained with regard to FIG. 2, through a transparent dome 38 to target 40.

The reflected beam 42 returns through the dome to the range gated laser receiver 44 where a signal is generated which is sent to range detector 46 and angle error detector 48 and from there to the navigation computer 50 and thence on to the flight control servo 52. Return beam 42 is reflected from concave mirror 49 on the focusing mirror 51 and thence to prism 53 from which it is directed to the laser receiver. Gyro 54 has a speed control 56. Precession is controlled by the power amplifier 58 through gyro precession coil 60.

Figure 2:
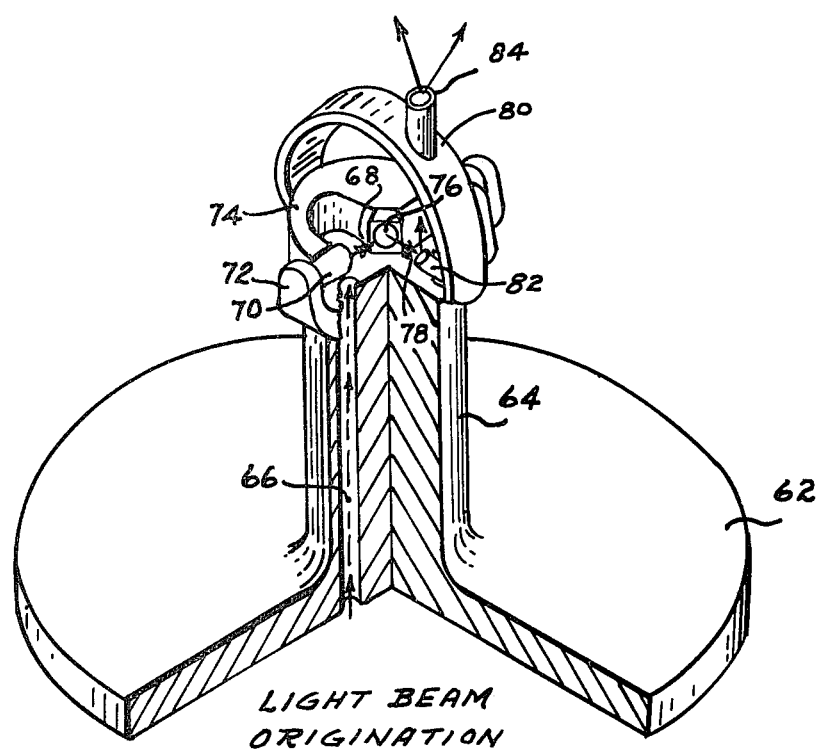
FIG. 2 is a perspective view, partly in section of an apparatus of the invention.

FIG. 2 shows the gimbaled optics utilized to transmit the pulsed laser beam. A base plate 62 having an elongated post 64 mounted thereon form the support structure for the optical system. Post 64 has an elongated aperture 66 located off center, to allow light to pass a first mirror 68 rigidly mounted on post 70, attached to yoke 72 and supporting inner gimbal 74. The beam is then directed to a second mirror 76, mounted on the movable inner gimbal 74. A third mirror 78 is rigidly fastened to the outer gimbal 80 via post 82. Outer gimbal 80 supports a beam diverging lens 84 so positioned as to accept the laser beam and direct the beam through the dome (38) of FIG. 1 at a gimbal angle of up to ±60 degrees.

It should be understood, of course, that the foregoing disclosure relates to only a preferred embodiment of the invention and that numerous modifications or alterations may be made therein without departing from the spirit and scope of the invention as set forth in the appended claims.

What is claimed is:

1. Optical radiation transmitting means for active optical tracking systems in missiles comprising: a base, a post mounted on the base having an aperture therethrough, parallel to the longitudinal axis of the post; an inner gimbal mounted on one end of the post including a yoke, a pin extending from the yoke and a movable gimbal ring; an outer movable gimbal ring connected to the inner gimbal ring including a pin extending through the inner gimbal ring; a diverging lens mounted on said outer gimbal ring; a first mirror means mounted on the yoke pin adapted to receive radiation passing through said aperture; a second mirror mounted on the inner gimbal adapted to receive radiation from the first mirror and a third mirror mounted on the outer gimbal pin adapted to receive radiation from the second mirror and direct said radiation through the diverging lens.

* * * * *